United States Patent [19]

Liang

[11] Patent Number: 5,050,694

[45] Date of Patent: Sep. 24, 1991

[54] ADJUSTABLE PLATFORM STAND FOR A WEIGH SCALE

[75] Inventor: Charles Liang, Glenview, Ill.

[73] Assignee: Pelouze Scale Co., Evanston, Ill.

[21] Appl. No.: 484,939

[22] Filed: Feb. 26, 1990

[51] Int. Cl.⁵ .............................................. G01G 21/22
[52] U.S. Cl. ..................................................... 177/262
[58] Field of Search ......................................... 177/262

[56] References Cited

U.S. PATENT DOCUMENTS

| 1,667,891 | 5/1928 | Hapgood | 177/ |
| 4,522,277 | 6/1985 | Kotzin | 177/262 X |

FOREIGN PATENT DOCUMENTS

| 302816 | 12/1928 | United Kingdom | 177/262 |
| 324176 | 1/1930 | United Kingdom | 177/262 |

Primary Examiner—George H. Miller, Jr.
Attorney, Agent, or Firm—Augustus G. Douvas

[57] ABSTRACT

An adjustable stand for a weigh scale in which the scale has a readout display at the front of the scale, and a weighing platform located behind the readout display. The adjustable stand is adapted to receive during one weighing operation one or more envelopes which are oversized relative to the platform. The adjustable stand comprises as upright envelope support which extends across the platform. The envelope support slideable engages the sides of the platform with a pair of C-shaped clamping guides. An upright lip is formed at the front of the platform. Appropriate sliding adjustment of the envelope support relative the lip enables one or more oversized envelopes to be securely held on the platform during a single weighing operation. The scale also features a circular platform support saddle. The periphery of the saddle is formed with a plurality of notches which engage fingerlike keys that project from the bottom of the platform. Rotary movement of the platform engages the keys in the notches to lock the detachable platform to the saddle.

15 Claims, 3 Drawing Sheets

ADJUSTABLE PLATFORM STAND FOR A WEIGH SCALE

This invention relates to an adjustable platform stand which is particularly adapted for holding oversized items, such as large envelopes and catalog sheets, on a small size scale for weighing and counting.

BACKGROUND OF THE INVENTION

The application of digital electronic technology to postal scales employing load cell transducers has resulted in relatively small scales having greatly improved accuracy. These scales also compute postal charges for various rates and priorities, and may have a piece count feature for counting in a single weighing operation a large number of items, such as catalog sheets.

As a result of the expanded weighing accuracy and counting capability of electronic scales there exists a need for an improved scale platform which will securely hold in a position for weighing large oversize envelopes and catalog sheets which overhang the platform. Additionally, the platform should be capable of holding a large number of these items for counting in a single operational step while on the platform. These objectives should preferably be attained by a platform structure which will still receive commonplace boxlike packages for weighing.

The invention described in this specification attains these goals with an adjustable platform stand design which differs from the following prior art known to the inventor.

U.S. Pat. No. 1,667,891 discloses a pivoting U-shaped adjustable linkage used to support large bulky and unwieldy items.

U.S. Pat. No. 4,368,791 discloses a pivoting holder for weighing envelopes. This holder operates through a lever mechanism and is not adapted for use with a scale platform.

U.S. Pat. No. 2,459,065 discloses a non-adjustable L-shaped weighing platform; and U.S. Pat. No. 2,731,255 discloses a nonadjustable V-shaped platform.

U.S. Pat. No. 1,619,594 discloses a weigh scale platform having a plurality of fixed sidewalls for retaining an item to be weighed.

U.S. Pat. No. 4,696,360 discloses a boxlike platform having a hinged cover.

None of these prior art designs are particularly suitable for use in a postal and counting scale.

SUMMARY OF THE INVENTION

Accordingly, a principal object of this invention is to provide a weigh scale platform which will securely support one or more oversize items, such as envelopes and sheets, on a scale for a single weighing or counting operation.

Another object is to provide a multi-purpose weigh scale platform which will not only attain the preceding object relating to envelopes and sheets, but which will also weigh packages of commonplace container and box shapes.

Another object is to provide a weigh scale platform, which while attaining the prior objects, is readily detachable from the scale for purposes of repair or replacement.

Another object is to provide an adjustable platform stand for a weigh scale which has a simple and economical design.

A preferred embodiment of this invention features an adjustable stand incorporated in a platform for a weigh scale in which the scale has a readout display at the front of the scale, and a weighing platform located behind the readout display.

The adjustable stand is adapted to receive during one weighing or counting operation one or more envelopes or sheets which are oversized relative to the platform. The adjustable stand comprises an upright envelope support which extends across the platform. The envelope support slideably engages the sides of the platform with a pair of C-shaped clamping guides.

An upright lip is formed at the front of the platform. Appropriate front-to-back sliding adjustment of the envelope support relative the lip enables one or more oversized envelopes to be securely held on the platform during a single weighing operation.

The scale also features a circular platform support saddle. The periphery of the saddle is formed with a plurality of notches which engage fingerlike keys that project from the bottom of the platform. Rotary movement of the platform engages the keys in the notches to lock the detachable platform to the saddle. The saddle is coupled to a conventional load cell having strain gauge transducers.

DESCRIPTION OF THE DRAWINGS

In order that all of the structural features of this invention may be readily understood, reference is made to the accompanying drawings wherein.

DESCRIPTION OF THE PREFERRED EMBODIMENT

Figure 1:
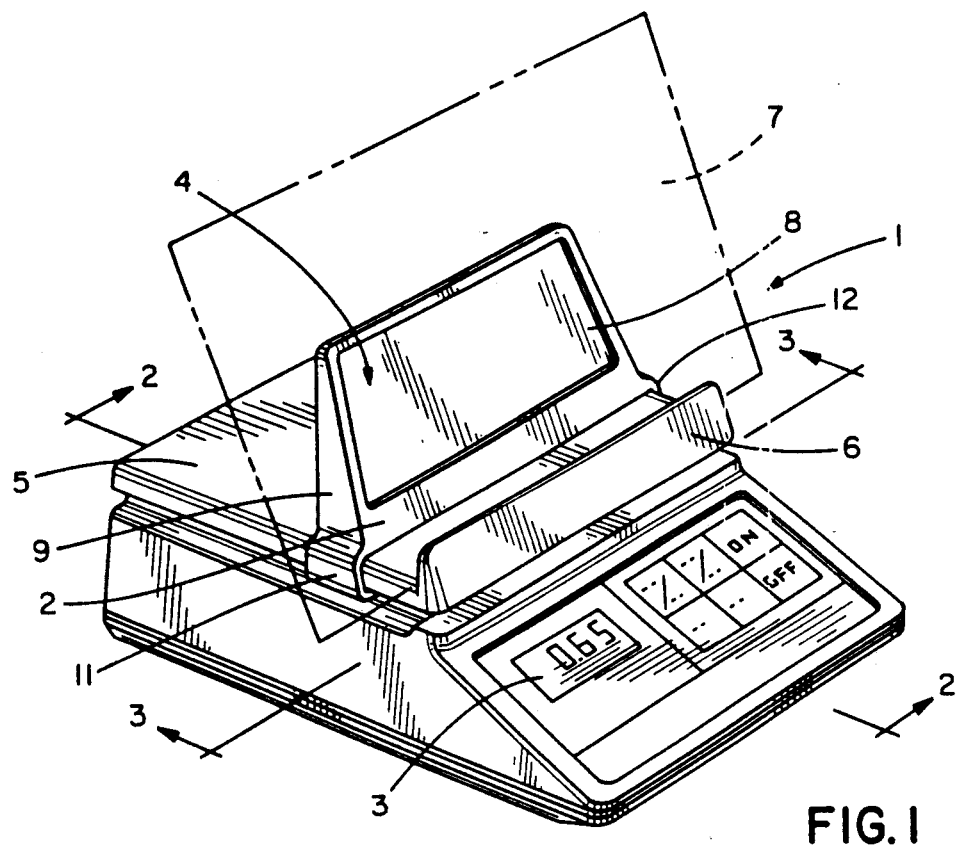
FIG. 1 is a perspective view of the weigh scale of this invention which features an adjustable envelope-support stand incorporated into a removable platform.
Figure 2:
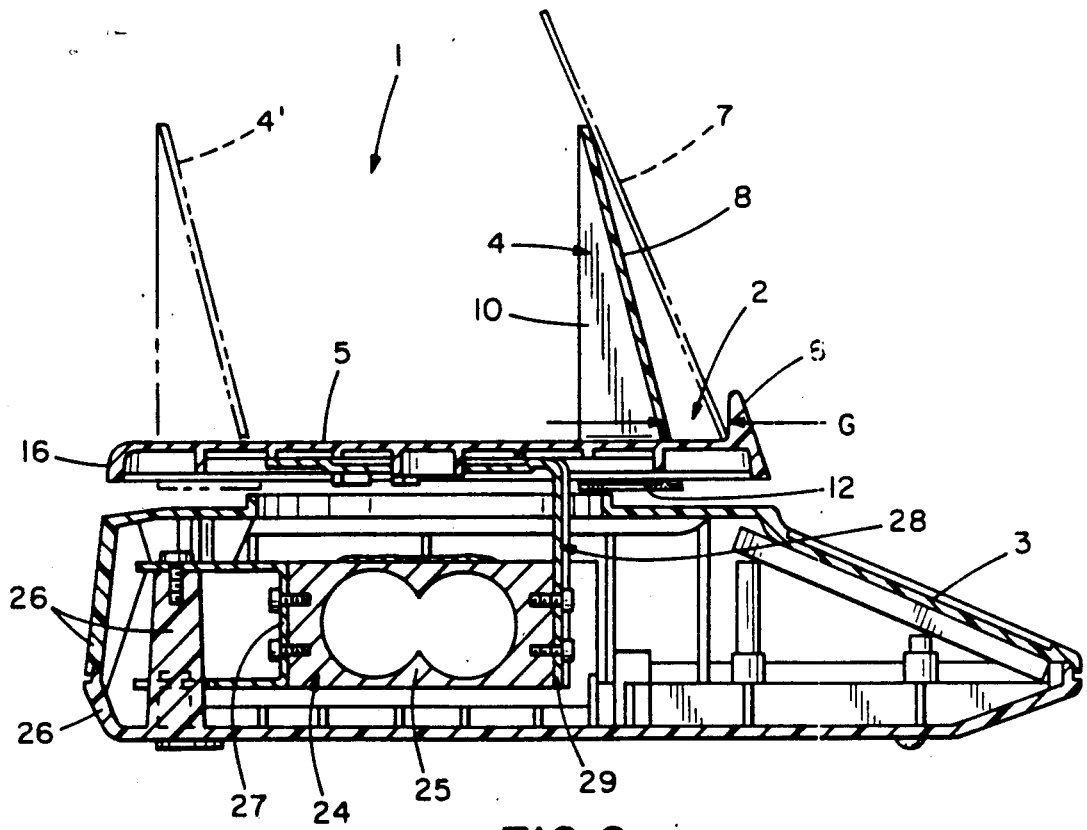
FIG. 2 is a section view taken along line 2—2 of FIG. 1 which shows lines an adjusted second position for the adjustable stand.
Figure 3:
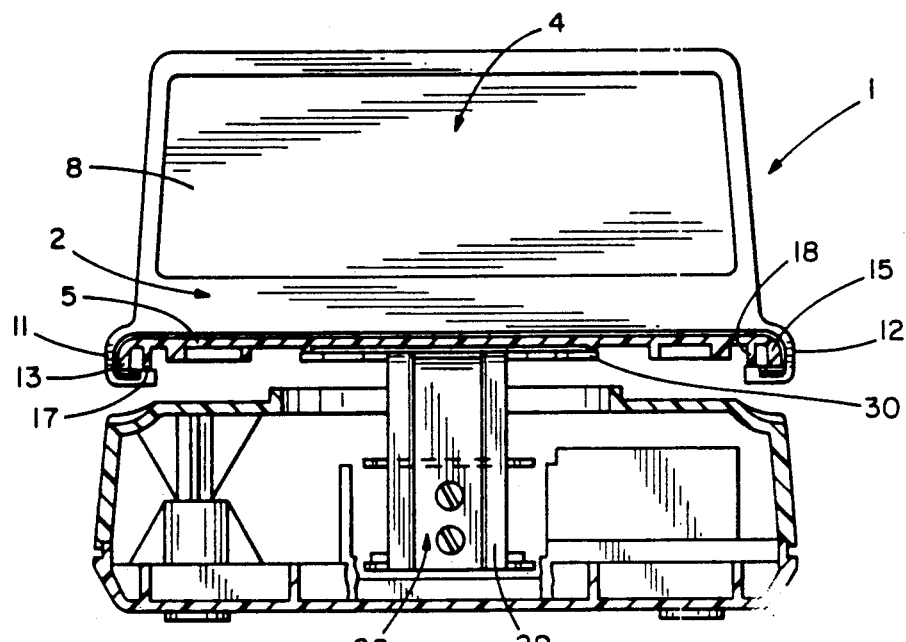
FIG. 3 is a section view taken along line 3—3 of FIG. 1 which shows details of the clamping guides of the adjustable stand and also a load-cell platform bracket.

Referring to FIGS. 1, 2 and 3 of the drawings, weigh scale 1 features an adjustable platform stand 2 which is capable of weighing a wide range of envelopes of different sizes. The term "envelopes" is used in this specification to include not only envelopes but also sheets, and other relatively thin, flat items of varying sizes.

Adjustable stand 2 is particularly designed for use in a postal rate computing scale, such as scale 1 whose display keyboard 3 may typically provide a numerical readout of envelope weights but also the actual postage required for the various classes of mail. The scale may also have piece count feature for counting catalog sheets or other thin, flat items.

Because of the particular design of adjustable platform stand 2, which features a slidable, and also removable upright envelope support 4, envelopes can project substantially beyond platform 5 and still be weighed (FIG. 1). This feature results in a postal weigh scale having a relatively small footprint which can process a wide range of envelope sizes without occupying substantial table space. In a preferred commercial embodiment, scale 1 occupies a surface area of about 5"×6.75" with a platform size of 4.75"×4.125".

Envelope support 4 cooperates with platform frontal lip 6 to sandwich envelope 7 (FIGS. 1 and 2) in a weighing position slightly inclined from a vertical attitude. Support 4 is manually adjustable from the front position on platform 5 shown in FIGS. 1 and 2, to the 4' rear position shown in broken line in FIG. 2. Accordingly, a large and varying number of "letter" envelopes or catalog sheets can be weighed and counted by a suitable program at the same time by suitably adjusting the envelope receiving gap G (FIG. 2) to sandwich tightly a group of these items.

Envelope support 4 is formed with a generally planar and rectangular back 8 carried on platform 5 by tapered side flanges 9 and 10, which flanges terminate in a pair of clamping guides 11 and 12, respectively.

Figure 5:
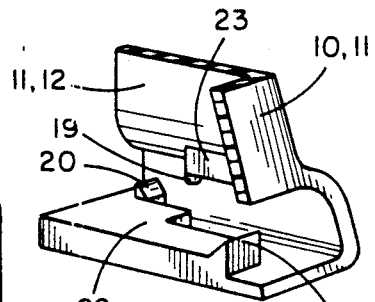
FIG. 5 is a perspective view of a clamping guide broken away from the remaining portion of the adjustable envelope support.
Figure 6:
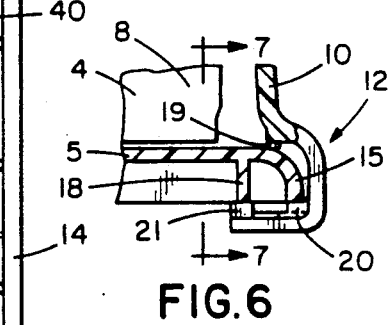
FIG. 6 is a partial section view taken along line 6—6 of FIG. 4 which shows a clamping guide coupled to the adjacent portion of the scale platform.
Figure 7:
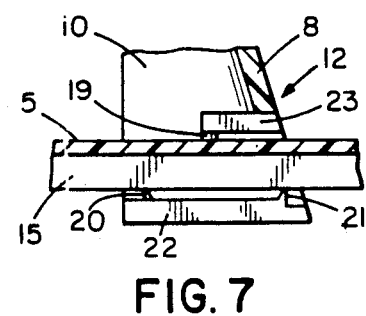
FIG. 7 is a section view taken along line 7—7 of FIG. 6 which shows the engagement of a clamping guide to a platform guide rail.

Each of clamping guide 11 and 12 is formed in a general C-shaped configuration (FIGS. 1 and 3) sized to hook around a front-to-back edge of platform 5 (FIGS. 5, 6 and 7).

Figure 4:
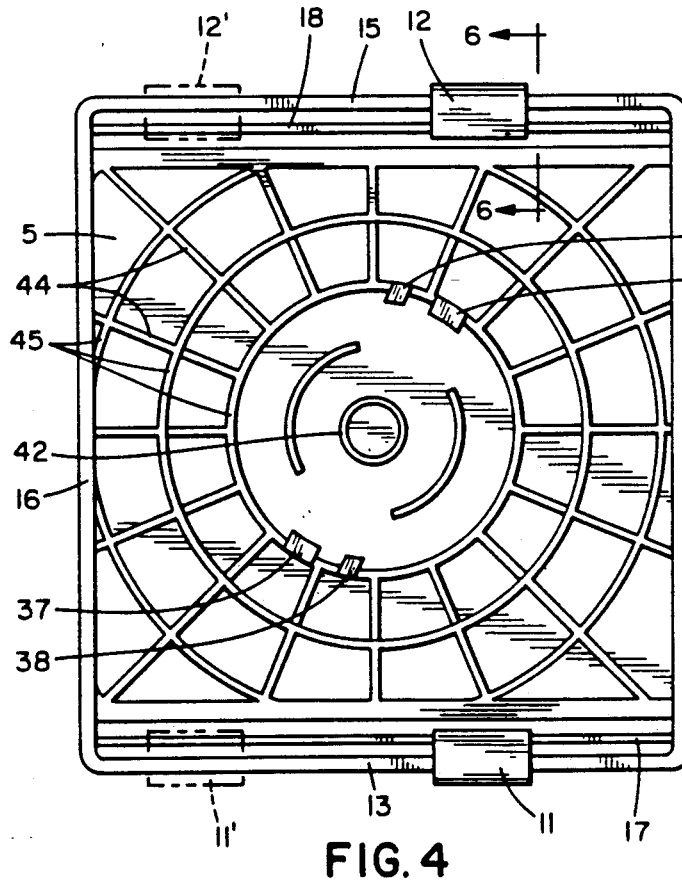
FIG. 4 is a bottom view of the scale platform which shows in broken line the clamping guides in the adjusted second position of FIG. 2.

As is best shown in FIG. 4, the bottom of platform 5 is formed with a downwardly-directed, rectangular, peripheral flange comprised of four joined straight sides 13, 14, 15 and 16. An elongated rib 17 integral with the bottom of platform 5 extends between sides 14 and 16 (FIG. 4) parallel with and slightly spaced from side 13. A second rib 18, identical to rib 17, also extends between sides 14 and 16 parallel with and slightly spaced fom side 15 (FIG. 4).

Side 13 and rib 17 form a supporting guide rail 13–17 for clamping guide 11; and side 15 and rib 18 form a supporting guide rail 15–18 for clamping guide 12. Platform stand 2 is manually adjusted as required by sliding envelope support 4 from front to back on the two guide rails (or back to front) to clamping guide positions 11' and 12' (FIG. 4).

In order to minimize sliding friction between clamping guides 11 and 12 and platform 5 guide rails 13–17 and 15–18, each of the clamping guides 10 and 11, is contoured in its interior (FIG. 5) to form pointed glide projections 19, 20 and 21 upon which envelope support 4 rides relative platform 5 (FIG. 7). Raised reinforcing sections 22 and 23 add strength to glide projections 19, 20 and 21 and also to the clamping guide.

In the event it is desired to weigh a relatively large-sized package (not shown) which will occupy all (or most) of the supporting surface of platform 5, envelope support 4 can be completely removed from the platform by simply sliding support 4 to the back of the platform until it detaches from the platform. After the package weighing operation, envelope support 4 can be returned to platform 5 by sliding clamping guides 11 and 12 into return engagement with the platform.

Figure 8:
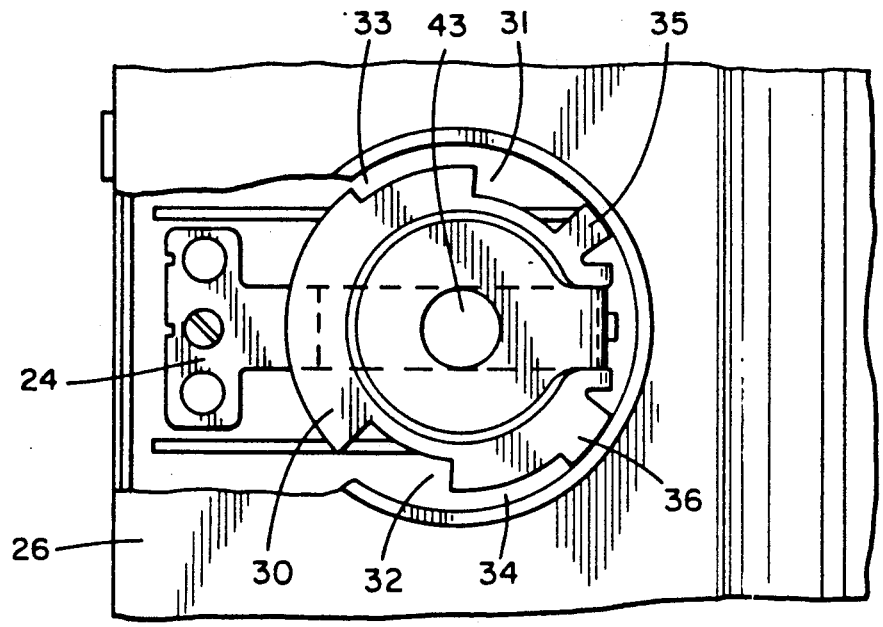
FIG. 8 is a plan view of the scale with the platform removed to a notched saddle which supports the platform in a locking engagement.
Figure 9:
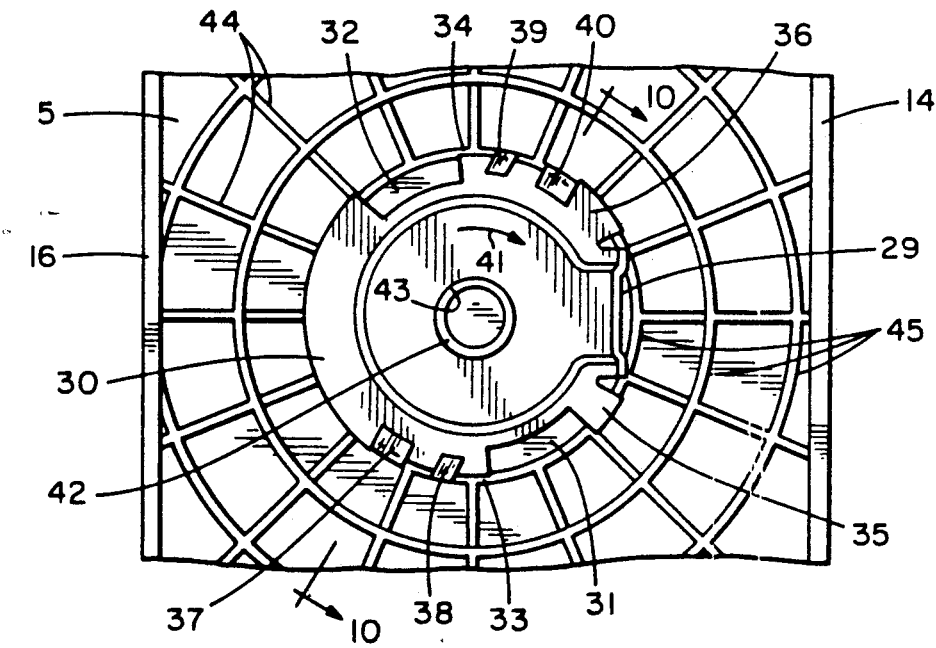
FIG. 9 is a bottom view which shows the engagement of a set of platform locking keys with the saddle notches.
Figure 10:
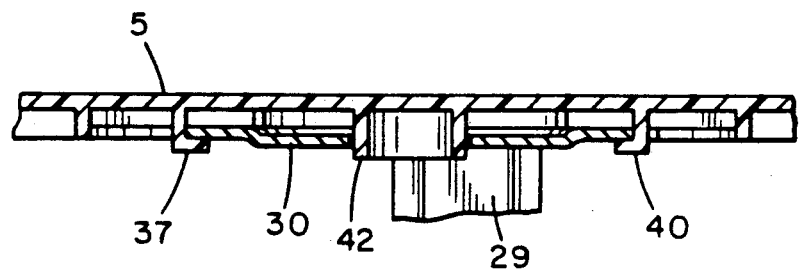
FIG. 10 is a section view taken along line 10—10 of FIG. 9 which also shows the engagement of the platform locking keys with the saddle notches.

The particular scale 1 shown in the drawings, employs a load cell 24 having a plurality of strain guage transducers mounted on a metallic body 25 (FIG. 2). The back side of metallic body 25 is screw anchored to scale base 26 by u-shaped bracket 27. Bracket 27 provides a cantilevered support for load cell 24 which is subjected to the strain produced by platform 5 (and any object placed on the platform for weighing) by supporting the platform bracket 28 (FIGS. 2 and 3). Bracket 28 is generally L-shaped and it is formed with a straight vertical leg 29 screw-anchored to the front side of metallic body 25, and a generally circular platform saddle 30 (FIGS. 8, 9 and 10).

The periphery of saddle 30 is formed with a plurality of deep saddle insert notches 31, 32, intermediate saddle locking notches 33, 34 and stop tabs 35, 36. Elements 31, 32, 33, 34, 35 and 36 are so located and sized relative to L-shaped finger-like locking keys so that a rotary twisting movement of platform 5 in the clockwise direction of arrow 41 (FIG. 9) after the locking keys ar appropriately inserted in the deep saddle insert notches, locks platform 5 to saddle 30. This locking step fixes the detachable platform 5 to scale base 26 when the locking keys rest in the saddle locking notches. Platform 5 can be removed for scale repairs by a counterclockwise twisting action of platform 5 relative saddle 30 (FIG. 9). Tab 36 serves to limit the locking twist angle; and tab 35 limits the unlocking twist angle and also prevents an improper wrongly directed attempt at locking.

The bottom of platform 5 is formed with a projecting center-located saddle alignment ring 42 (FIGS. 9 and 10) which mates with alignment hole 43 (FIG. 8) formed in saddle 30 so as to facilitate aligned engagement of the platform on the saddle. The set of radial ribs 44 and concentric circular ribs 45 serve to reinforce platform 5.

In a preferred embodiment, adjustable stand 2, platform 5, and scale base 26 are fabricated from plastic. Load-cell platform bracket 28, which includes saddle 30, are constructed from metal.

It should be understood, the above described preferred embodiment is merely illustrative of the novel structural features of this invention. Modifications can be made without departing from the scope of the invention.

What is claimed is:

1. A weigh scale having an adjustable platform stand comprising a scale platform for receiving on a platform weighing surface one or more items to be weighed, an item support slidably engaging the scale platform so that the support is adjustably slideable relative the platform weighing surface to vary the area of surface available for receiving items to be weighed.

2. The combination of claim 1 in which the item support has a generally upright attitude which attitude is fixed.

3. The combination of claim 2 in which the platform has a pair of front-to-back sides which define the width of the platform, and means included as part of the item support which engage both sides of the platform so that the item support is guided by both platform sides in front-to-back slideable adjustment of the item support relative the platform.

4. The combination of claim 3 in which a generally upright frontal lip is located at the front of the platform generally transverse to the front-to-back sides of the platform with the item support and the frontal lip defining an adjustably varying platform surface for weighing items placed on the platform surface area located between the frontal lip and the item support.

5. The combination of claim 3 in which the means engaging the platform is a pair of spaced clamping guides which individually hook around a different one of the platform sides.

6. The combination of claim 5 in which each of the clamping guides has a generally C-shaped configuration.

7. The combination of claim 1 comprising a plurality of key elements projecting from the bottom of the platform, and a generally circular platform-supporting saddle formed with a plurality of spaced locking notches for receiving the key elements upon a circular twisting movement of the platform relative the saddle.

8. The combination of claim 7 in which the locking notches are located o the periphery of the saddle.

9. The combination of claim 8 in which a deep key insert notch is located adjacent each locking notch with the locking notches being less deep than the insert notches so that upon initial aligned insertion of the key elements in the insert notches and a subsequent twisting action the locking keys tightly engage the locking notches.

10. The combination of claim 9 including a pair of stop tabs located on and projecting from the generally circular periphery of the saddle to stop an otherwise excessive locking twisting movement and to prevent an erroneous reverse twisting movement which will not lock the platform to the saddle.

11. An adjustable stand for a weigh scale in which the scale has a readout display at the front of the scale and a weighing platform located behind the readout display and in which the adjustable stand is adapted to receive during one weighing operation one or more envelopes which are oversized relative the weighing surface area of the platform so as to overhang the platform, comprising an upright envelope support having a generally planar envelope upright-rest area with the envelope support being slideably carried on the weighing surface area of the platform and extending across the weighing surface area generally transverse to the front-to-back axis of the platform surface so that the sliding movement of the upright envelope support is aligned with the front-to-back axis of the platform surface.

12. The combination of claim 11 comprising a generally upright lip located on a frontal edge of the platform generally transverse to the front-to-back axis of the platform surface to form an adjustable envelope receiving gap located between the envelope support and the lip so that appropriate sliding adjustment of the envelope support relative the lip securely wedges any one or more envelopes which are to be weighed.

13. The combination of claim 12 in which the platform has a pair of front-to-back sides which define the width of the platform, and means included as part of the envelope support which engage sides of the platform so that the envelope support is guided by the platform in front-to-back slideable adjustment of the envelope support relative the platform.

14. The combination of claim 13 in which the means engaging the platform is a pair of spaced clamping guides which individually hook around a different one of the platform sides.

15. The combination of claim 14 in which each of the clamping guides has a generally C-shaped configuration.

* * * * *